(12) United States Patent
Linares et al.

(10) Patent No.: US 7,032,977 B2
(45) Date of Patent: Apr. 25, 2006

(54) LIGHT-DUTY TRUCK DUMPING MECHANISM

(75) Inventors: Miguel A. Linares, Bloomfield Hills, MI (US); Panfilo M. Dinello, Clinton Township, MI (US)

(73) Assignee: Global Tech International, Inc., Clinton Twp., MI (US)

( * ) Notice: Subject to any disclaimer, the term of this patent is extended or adjusted under 35 U.S.C. 154(b) by 0 days.

(21) Appl. No.: 10/530,257

(22) PCT Filed: Sep. 30, 2003

(86) PCT No.: PCT/US03/30842

§ 371 (c)(1),
(2), (4) Date: Mar. 30, 2005

(87) PCT Pub. No.: WO2004/030983

PCT Pub. Date: Apr. 15, 2004

(65) Prior Publication Data

US 2006/0043779 A1     Mar. 2, 2006

Related U.S. Application Data

(60) Provisional application No. 60/414,970, filed on Sep. 30, 2002.

(51) Int. Cl.
*B60P 1/16* (2006.01)
(52) U.S. Cl. ................. 298/1 A; 298/22 P; 298/17 SG
(58) Field of Classification Search ................. 298/1 A, 298/22 R, 17 R, 22 P, 22 D, 17 SG, 22 J; 296/183.2, 39.2
See application file for complete search history.

(56) References Cited

U.S. PATENT DOCUMENTS

| 3,833,261 A |   | 9/1974 | Dingler |
|---|---|---|---|
| 3,871,706 A | * | 3/1975 | Odom ........................ 298/1 A |
| 4,741,575 A | * | 5/1988 | Sloan .......................... 298/12 |
| 6,196,634 B1 |   | 3/2001 | Jurinek |
| 6,371,564 B1 |   | 4/2002 | Yates et al. |

* cited by examiner

Primary Examiner—Stephen Gordon
(74) Attorney, Agent, or Firm—Cargill & Associates, PLLC

(57) ABSTRACT

A light-duty truck dumping mechanism is disclosed for pick-up trucks utilizing singularly molded truck box beds, and the tilting mechanism used to dump the contents out of the pick-up truck box bed. Another embodiment of the invention includes a double-folding ramp which can be utilized to extend to the ground in order to allow for easy carrying and loading of a pick-up box. The combination of the singularly molded pick-up truck box bed having inserts therein with a hydraulic stanchion support and dumping mechanism yields a light-duty truck which can be used for dumping. Although in its most simple form, a singular stanchion and hydraulic dumping mechanism may be utilized, more than one stanchion and hydraulic lifting mechanism may also be utilized.

10 Claims, 4 Drawing Sheets

LIGHT-DUTY TRUCK DUMPING MECHANISM

CROSS REFERENCES TO RELATED APPLICATIONS

This application claims the benefit of U.S. Provisional Application No. 60/414,970 filed on Sep. 30, 2002.

TECHNICAL FIELD

This patent application relates to dump trucks, and more particularly to a dump truck tipping mechanism for use with a light-duty truck having a singularly molded pick-up truck box bed.

BACKGROUND OF THE INVENTION

Dump trucks have become a mainstay in the automotive market for agricultural, commercial, landscaping and other uses. Generally, these dump trucks are large heavy-duty trucks with heavy-duty hydraulics systems for lifting the relatively heavy metal truck box beds. The lifting and tipping systems not only have to lift the truck box itself but it must also lift the contents of the box as well.

Since the automotive industry has been trying to reduce the weight of their vehicles, they have been looking at plastic pick-up boxes, as they are much lighter in weight than a traditional steel metal pick-up truck boxes. One type of pick-up truck box made of plastic is made by a powder molding technology owned by 3DM Technologies, Inc., of Troy, Mich. The pick-up truck box made by their process is approximately 100 pounds less than a standard metal pick-up truck box, lending itself to a much simpler method and mechanism for affecting a dump truck tipping mechanism. By powder molding the truck box itself, stanchion supports and other metallic inserts can be molded directly into the pick-up truck box, acting as connecting and attachment points for the hydraulic dumping mechanism.

It is an object of the present invention to utilize the reduced weight and singular component truck box bed created by the use of new powder molded technology for making a light weight, easily lifted, one piece plastic body. The PCT International Patent Application Ser. No. PCT/US02/03298 for the invention entitled "Processes For Forming Plastic, Apparatuses For Forming Plastic, And Articles Made Therefrom", also owned by the present owners of this application, is incorporated herein by reference. U.S. Provisional Patent Application No. 60/414,969 is also incorporated herein by reference.

Therefore, it is an object of the present invention to provide a lightweight dump truck for use on street grade, light-duty pick-up trucks, without having the need to purchase a special heavy-duty truck. Also, as the truck box is made by the new powder mold technology described above, the payload capacity has increased, thereby making the dump truck tipping mechanism more desirable. The present invention provides these objects and advantages and also provides a tailgate construction which can reach down to the ground such that a normal size light-duty pick-up truck can be utilized for running various tools and equipment directly up the tailgate into the bed of the truck, allowing the use of heavy duty wheelchairs, recreational vehicles such as ATVs and motorcycles, as well as the loading of small livestock, including dogs and the like.

SUMMARY OF THE INVENTION

In accordance with the above-noted advantages and desires of the industry, the present invention provides a light-duty dumping mechanism for use in a street grade pick-up truck, a method of making the same, and a standardized pick-up truck conversion kit for converting an off the belt pick-up truck to a dumping mechanism. The present invention includes a particular type of powder molded, double-skinned sandwiched plastic truck bed having stanchion supports and other metallic inserts molded directly into the plastic pick-up truck box itself, in order to act as connecting and attachment points for the hydraulic dumping mechanism which is called for in one embodiment of the present invention.

One specific preferred embodiment has certain features including a plastic pick-up box for attachment to the chassis of a pick-up truck including a hydraulic lifting mechanism and a compatible tailgate for dumping the contents of the pick-up box.

In yet another embodiment of the present invention, a method of making such a dumping pick-up truck mechanism is also disclosed, wherein the pick-up box is molded utilizing powder mold technology, and incorporating certain metallic inserts into the mold prior to the melting of the plastic pellets or powder, resulting in a one piece construction of a pick-up box that can be attached to the chassis of a standard pick-up truck.

The invention is particularly useful for applications of small load movement, and especially in situations where a small pick-up truck is easier to maneuver, for example apple orchards and the like, between the trees, etc. Other advantages include the lower purchase price of a pick-up truck compared to a full size dumping truck, as well as the fact that a normal pick-up truck does not need to be stopped and weighed at every weigh station on an expressway.

Although the invention will be described by way of examples hereinbelow for specific embodiments having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different embodiments and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various embodiments of the present invention, reference shall be made to the following detailed description, and when taken in conjunction with the accompanying drawings, in which like parts are given the same reference numerals, and wherein.

DETAILED DESCRIPTION OF THE INVENTION

Figure 1:
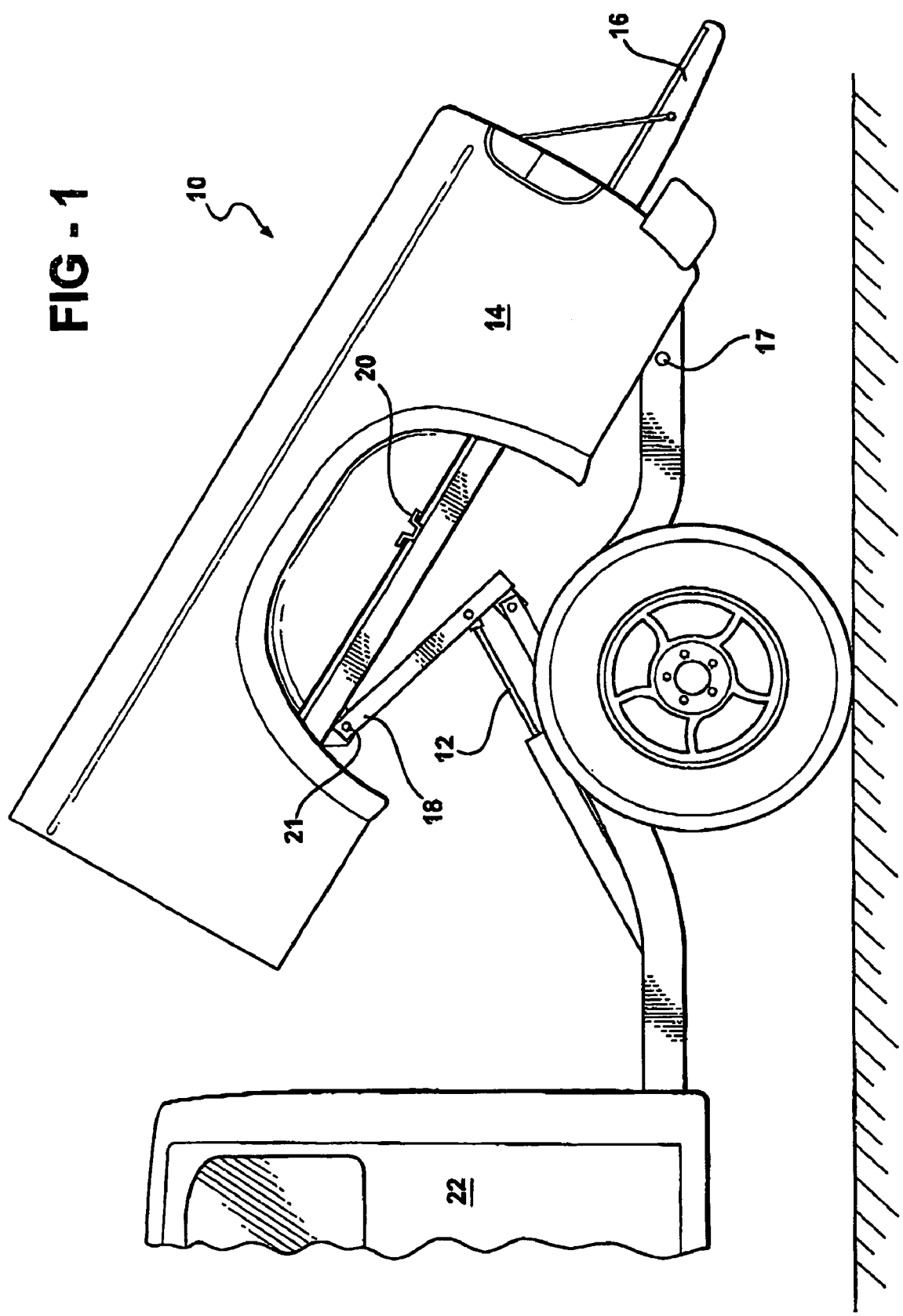
FIG. 1 is a side elevational view of a light-duty pick-up truck mechanism made in accordance with the present invention.
Figure 2:
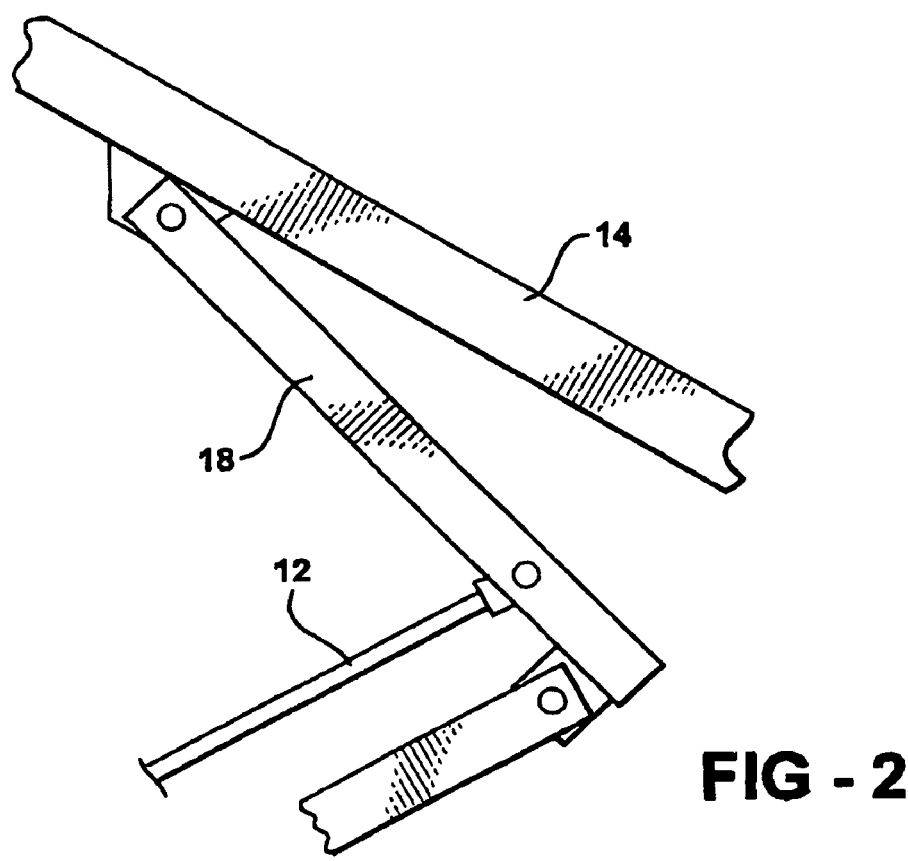
FIG. 2 details the hydraulic lifting mechanism in place within the light-duty pick-up truck.
Figure 3:
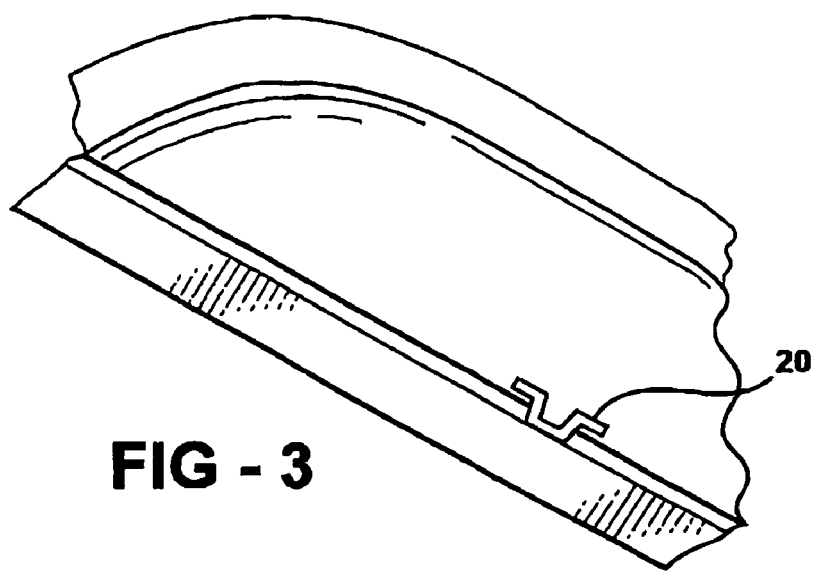
FIG. 3 is a detail of a stanchion for lifting.

With combined reference to FIGS. 1–4, there is shown a tipping mechanism generally denoted by the numeral 10. Mechanism 10 includes a hydraulic lifting mechanism 12 attached to a truck box bed 14. FIG. 2 shows more details of a stanchion 18 which is attached to the hydraulic lifter 12 of FIG. 1. Stanchion 18 is shown in its relative placement to the truck box 14 and is the acting member to tip the box. Stanchion 18 is attached to a metal stanchion transverse support 20 located on the underside of the truck box, as shown in FIG. 2. The hydraulic lifter 12 is activated from within the cab of the truck 22 as seen in FIG. 3.

Figure 4:
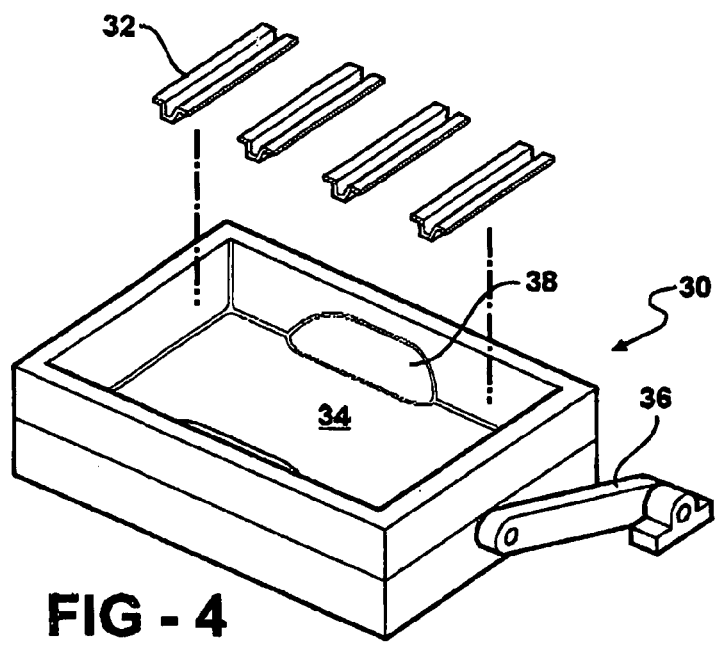
FIG. 4 is an exploded perspective of inserts being placed into the mold.

As shown in FIG. 1, the hydraulic cylinder 12 is a single stroke hydraulic cylinder and is attached to stanchion 18 which extends upwardly and is attached to the underside of the truck box body. When hydraulic cylinder 12 extends, stanchion 18 rises up and tips the truck box bed which is pivotally attached to the truck frame by pivot 17. The truck box body which makes this configuration possible is the powder molded truck box, which also allows for the molded-in inserts of the transverse metal stanchion support 20 as seen in FIG. 3. The terms "powder" and "particulate" are used herein interchangeably. Of course, any number of stanchion supports may be utilized, and they may be incorporated into the powder molded truck box bed, as well as they may attach to any number of reinforcements within the powder molded material itself. The stanchion pivots on a pivoting access 21 which allows the truck box body 14 to tip up when the hydraulic cylinder 12 is extended. The hydraulic lines appear in the hydraulic cylinder 12 in FIG. 1, and are activated by a hydraulic line activator and/or switch located within cab 22. Such means for activation is not shown, although the actuator is standard in the art. The top side of truck box body 14 is illustrated in FIG. 3, as well as shown in FIG. 4. Truck tailgate 16 may also be made out of the powder mold technology. It is envisioned that tailgate 16 could be made into a configuration that will touch the ground when the truck box is tipped, thereby allowing wheelchairs, motorcycles, dogs, livestock, etc., to climb into the truck box.

Therefore, the present invention has provided a new tipping mechanism in combination with a powder molded truck box body for making a regular sized one-ton pick-up truck into a tilting dump truck. The powder mold truck box body makes possible the tilting or tipping mechanism because the truck box body made of powder mold is approximately 95 pounds less than a standard steel pick-up box. Because there is less weight to lift, the tilting mechanism becomes very simple. When a payload of one ton is placed in the truck, the reduced weight of the truck box body significantly increases the capability of a hydraulic cylinder to lift, which enables the present invention.

Furthermore, the present invention is especially enabled because the powder mold technology allows for any reinforcing insert to be placed directly into the plastic mold itself. For example, the metal support bars which act as transverse stanchion supports, such that the foamed plastic center can foam up around and encapsulate the stanchion supports, thereby giving a high rigidity factor to the truck box body itself. It is this combination of factors, i.e. the light-weight construction, the ability to encapsulate and incorporate metal stanchion support inserts into the mold, as well as the use of a hydraulic cylinder which is the preferred combination for the present invention.

FIG. 4 illustrates a female powder mold halve generally denoted by numeral 30 wherein inserts 32 are placed on the floor of the mold 34 in and around the mold wheel well indentation. As disclosed in the reference incorporated herein, the powder mold procedure generally includes two complementary molds, a male mold and a female mold. The powder mold method includes heating both male and female molds, and contacting them with a particulate or powdered plastic material which melts at a temperature from about 180° Fahrenheit to about 500° Fahrenheit, in order to melt most conventionally available plastics. As discussed above, inserts may be placed in the mold before a foaming plastic particulate such that the expanded foaming particulate surrounds the inserts and incorporates it into the final article.

Figure 5:
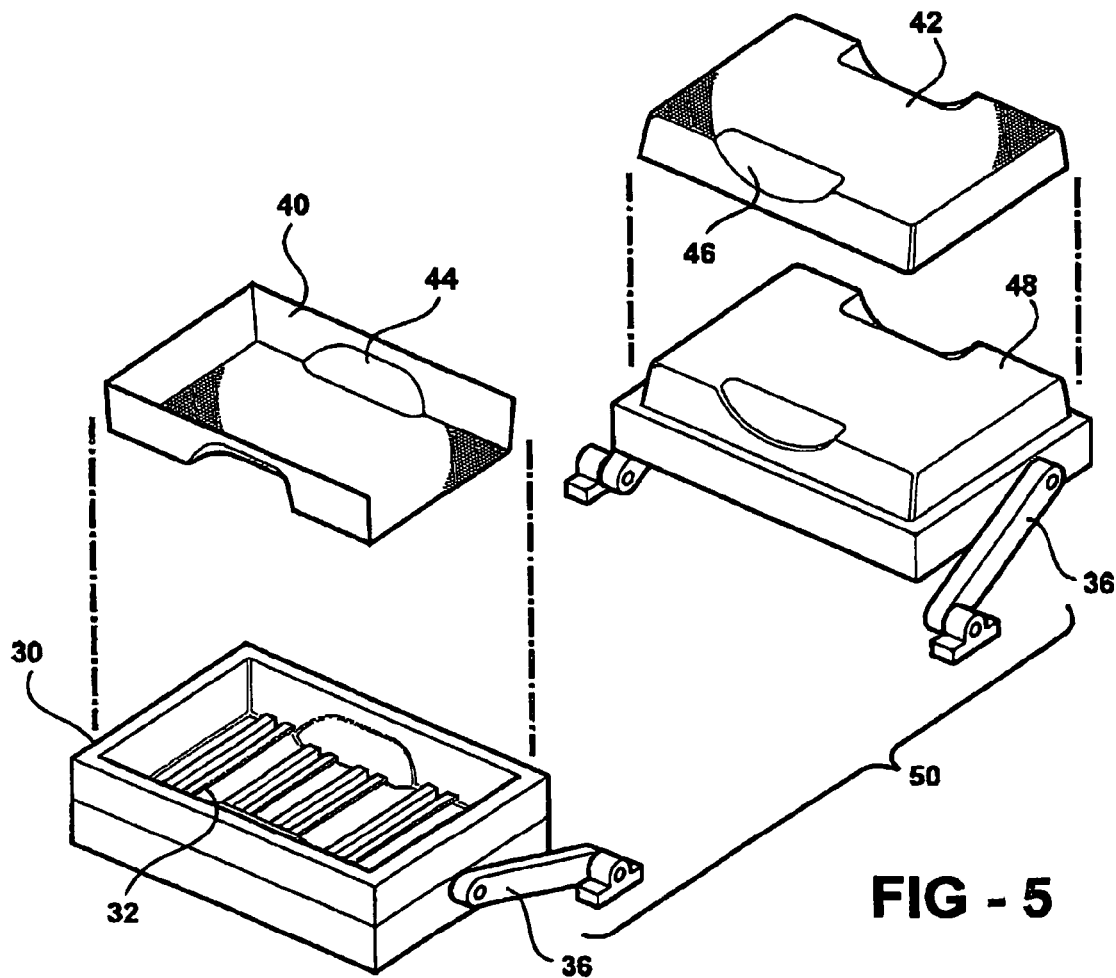
FIG. 5 is an exploded perspective showing male and female reinforcing metal mesh components being placed into the mold.

Looking next to FIG. 5, there is shown a female powder mold halve 30 with inserts 32 located therein. A male metal reinforcing mesh component 40 having a male mesh wheel well indentation 44 may be placed into the mold prior to the placement of the foaming plastic. Also shown in FIG. 5 is a male mold halve 48 which is also receiving a female metal reinforcing mesh component having a female mesh wheel well indentation 46. Both the male and female powder mold halves 30 and 48, respectively, are attached to a tipping mechanism 36 in order to dispose of the unmelted contacted plastic particulates once the desired skin thickness has been achieved.

In essence, the two powder mold halves are heated and contacted with plastic for a length of time to achieve a certain skin thickness, preferably from about 1 millimeter to about 10 millimeters. The general experience is that a mold at 300° Fahrenheit contacting a polyurethane powdered particulate material needs approximately one minute per 1 millimeter of desired thickness for contacting. In the event that a coarser material, such as pellets rather than powder is contacted, those contacting times may need to be longer. Once the desired thickness has been achieved, the excess powder contacting the heated mold is removed, for example by tipping, or by vacuum, and then any desired inserts are placed into the female mold, followed by the placement of foamable thermo plastic particulate material. The male mold is then placed over the female mold, as shown further hereinbelow with reference to FIG. 6, and the heat from the heated molds "kickoff" and expand the thermo plastic material to the height that the male and female molds are held apart. Once the part has been achieved, the mold is cooled, and the resulting part has been manufactured.

Figure 6:
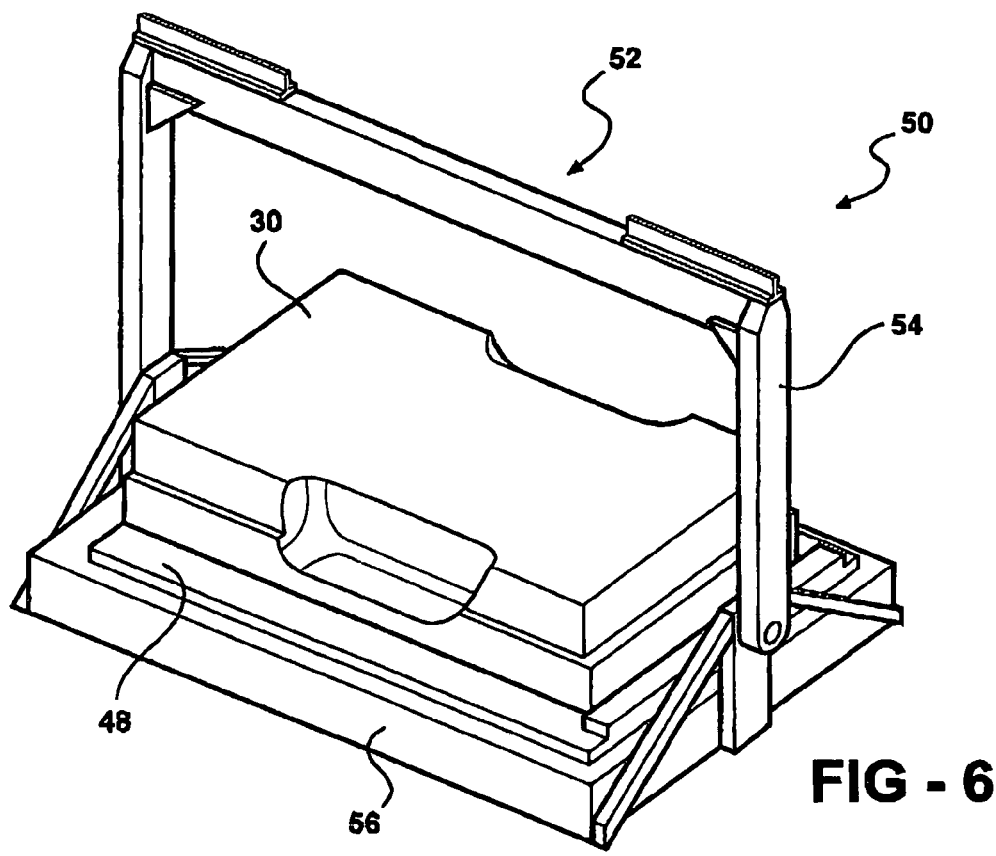
FIG. 6 illustrates the male and female molds held against each other.
Figure 7:
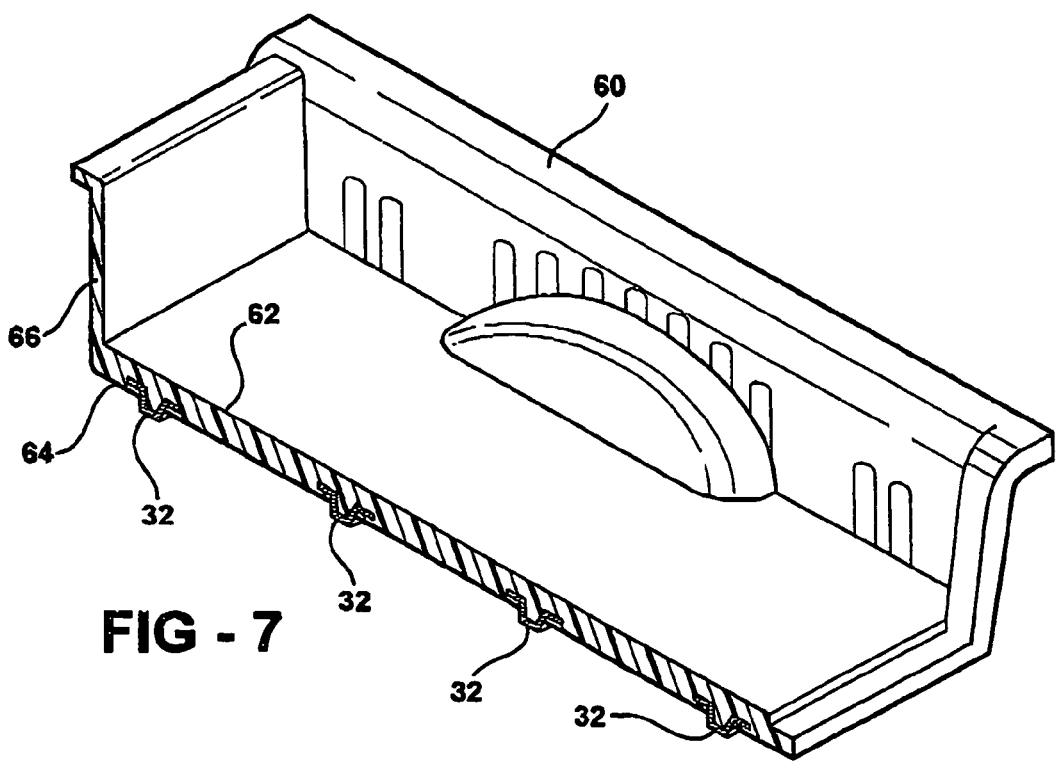
FIG. 7 is a cutaway perspective view of a truck box bed made in accordance with the present invention.

Looking now to FIG. 6, there is shown the male and female mold halves of FIG. 5 in their nested configuration held in place by a trunion generally denoted by the numeral 52, including a trunion pillar 54. The male and female molds 48 and 30, respectively, are nested together and held together at a particular distance apart to achieve the desired thickness of resulting article, and placed upon trunion platform 56. After the molds have been cooled, the resulting article appears as that shown in FIG. 7, and is generally denoted by numeral 60. The powder mold truck box bed 60 includes an upper skin 62, a lower skin 64, and a foamed plastic interior 66. As one can see, inserts 32 (from FIG. 4) are locked into place and secured via the foamed plastic interior 66. The inserts have been placed into the mold in their desired locations so that they may be merely bolted on to the stanchion supports as illustrated in FIGS. 1 thru 3.

Further stanchion supports and inserts may be necessary for different configurations of varying pick-up truck box beds, and those modifications can be made without undo experimentation on the part of the practitioner.

The foregoing description of a preferred embodiment of the invention has been presented for purposes of illustration and description. It is not intended to be exhaustive or to limit the invention to the precise form disclosed. Obvious modifications or variations are possible in light of the above teachings with regards to the specific embodiments. The embodiment was chosen and described in order to best illustrate the principles of the invention and its practical applications to thereby enable one of ordinary skill in the art to best utilize the invention in various embodiments and with various modifications as are suited to the particular use contemplated. It is intended that the scope of the invention be defined by the claims which are appended hereto.

INDUSTRIAL APPLICABILITY

The industrial applicability of the present invention is found mostly in the automotive industry, but such a tilting pick-up truck bed may also find utility in the agricultural industry, landscaping industry, as well as in the farming industry. The present invention finds particular utility with regards to harvesting of fruits that are found in trees and in applications where a large dump truck is impossible or unwieldy.

What is claimed is:

1. A light-duty dumping mechanism for use on a pick-up truck chassis, comprising:
   a powder-molded pick-up truck box bed for carrying a load, said truck box bed having a sandwiched plastic configuration formed from melted particulate material in a heated mold, said powder-molded pick-up truck box bed including an inner and an outer skin;
   at least one stanchion-supporting insert encapsulated within the sandwiched plastic configuration pick-up truck box bed;
   a lifting mechanism attached to the at least one stanchion-supporting insert encapsulated within the sandwiched plastic configuration pick-up truck box bed, said lifting mechanism also extending to and being attached to the chassis of the pick-up truck; and
   a pivot point between and connecting the pick-up truck chassis and the sandwiched plastic configuration pick-up truck box bed, whereby said lifting mechanism lifts against the stanchion-supporting insert and tilts the pick-up truck box bed against the pivot point so that the pick-up truck bed is able to dump any contents therein.

2. The mechanism of claim 1, further comprising a reinforcing metallic mesh sheet formed to a likeness of the pick-up truck box bed, said reinforcing mesh sheet being formed into a foamed core center of the sandwiched configuration to provide a higher modulus of strength for the pick-up truck box bed.

3. The mechanism of claim 1, further comprising a tailgate capable of extending to the ground for easier loading.

4. The mechanism of claim 1, wherein the stanchion-supporting insert includes a metal U-shaped channel adapted to be able to lift the entire truck box bed with its load to dump its contents.

5. The mechanism of claim 1, wherein the powder-molded pick-up truck box bed made from melted particulate material is formed of polyurethane plastic powder particulate material.

6. A light-duty dumping mechanism for use on a pick-up truck chassis, comprising:
   a powder-molded pick-up truck box bed for carrying a load having a sandwiched plastic configuration formed from melted particulate material in a heated mold, said powder-molded pick-up truck box bed including an inner and an outer skin with a foamed core center extending therebetween;
   at least one stanchion-supporting insert encapsulated within the foamed core center of the sandwiched plastic configuration pick-up truck box bed;
   a lifting mechanism attached to the at least one stanchion-supporting insert encapsulated within the sandwiched plastic configuration pick-up truck box bed, said lifting mechanism also extending to and attached to the chassis of the pick-up truck; and
   a pivot point between and connecting the pick-up truck chassis and the double skinned sandwiched plastic configuration pick-up truck box bed, whereby said lifting mechanism lifts against the stanchion-supporting insert and tilts the pick-up truck box bed against the pivot point so that the pick-up truck bed is able to dump any contents therein.

7. The mechanism of claim 6, further comprising a reinforcing metallic mesh sheet formed to a likeness of the pick-up truck box bed, said reinforcing mesh sheet being formed into the foamed core center of the sandwiched configuration to provide a higher modulus of strength for the pick-up truck box bed.

8. The mechanism of claim 6, further comprising a tailgate capable of extending to the ground for easier loading.

9. The mechanism of claim 6, wherein the stanchion-supporting insert includes a metal U-shaped channel adapted to be able to lift the entire truck box bed with its load to dump its contents.

10. The mechanism of claim 6, wherein the powder-molded pick-up truck box bed made from melted particulate material is formed of polyurethane plastic powder particulate material.

* * * * *